O. NELSON.
LOCK FOR GEAR SHIFT LEVERS.
APPLICATION FILED DEC. 13, 1919.
1,364,578.
Patented Jan. 4, 1921.
2 SHEETS—SHEET 1.
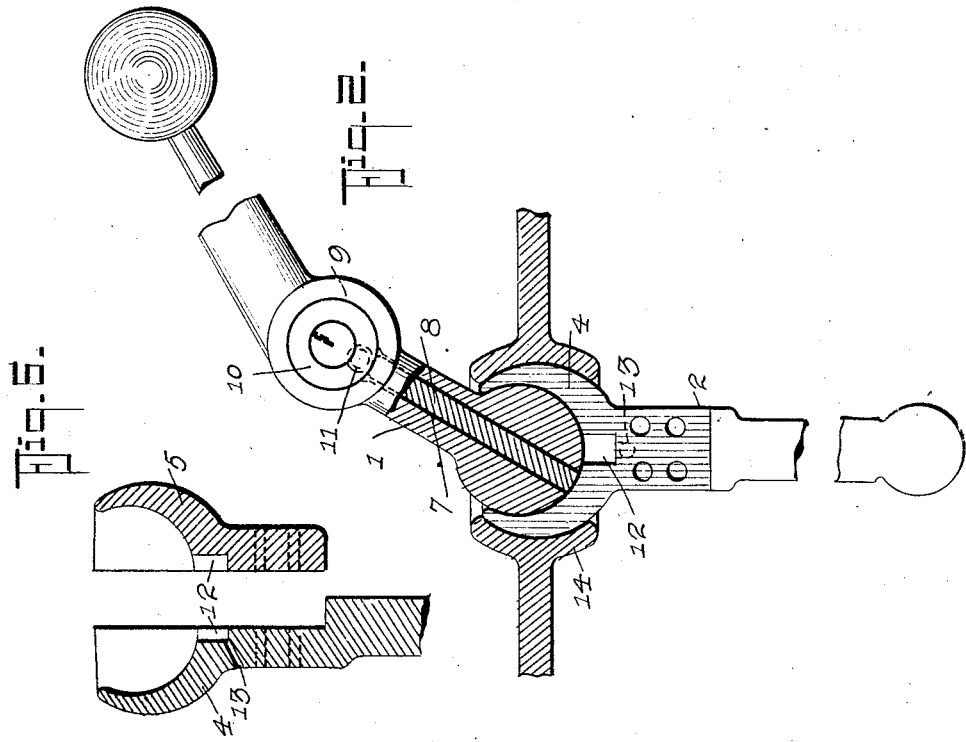
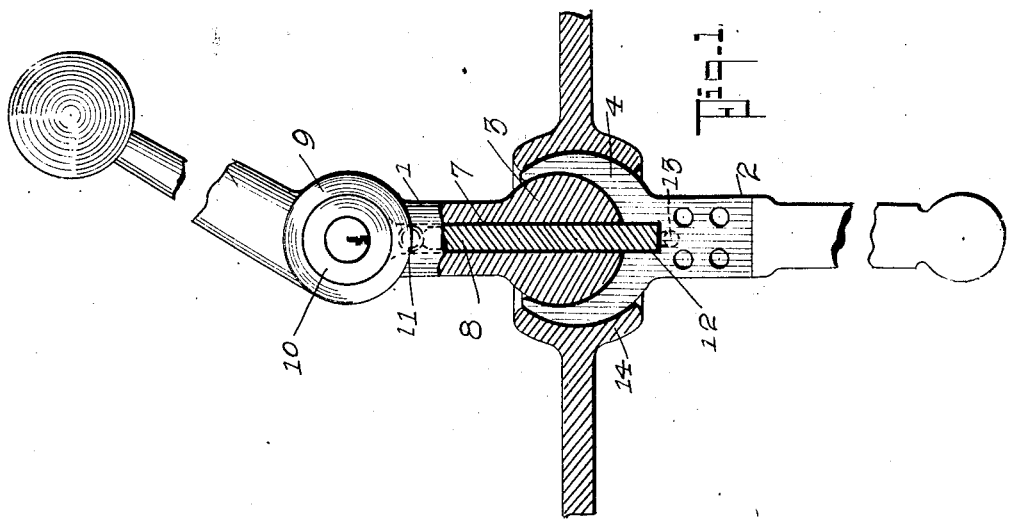
WITNESSES
Geo. V. Hall
INVENTOR
Ole Nelson.
BY
ATTORNEYS

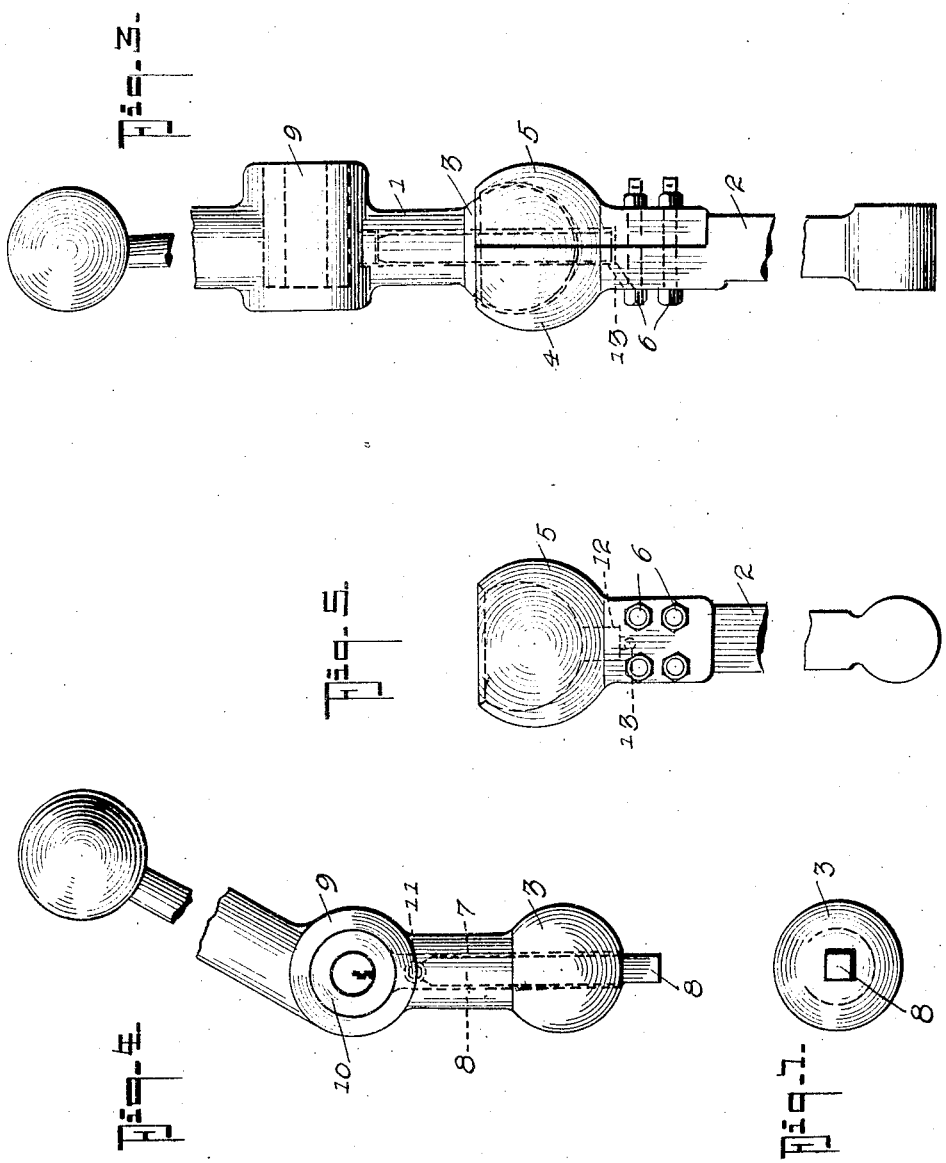

UNITED STATES PATENT OFFICE.

OLE NELSON, OF DETROIT, MICHIGAN.

LOCK FOR GEAR-SHIFT LEVERS.

1,364,578.

Specification of Letters Patent.

Patented Jan. 4, 1921.

Application filed December 13, 1919. Serial No. 344,607.

*To all whom it may concern:*

Be it known that I, OLE NELSON, a citizen of the United States, and a resident of Detroit, in the county of Wayne and State of Michigan, have invented certain new and useful Improvements in Locks for Gear-Shift Levers, of which the following is a specification.

My invention is an improvement in locks for gear shift levers of motor vehicles, and the invention has for its object to provide mechanism in connection with levers of the character specified, for preventing unauthorized use of the vehicle, when desired, by making it impossible for any one to use the lever to operate the transmission.

In the drawings:

Figure 1 is a side view with parts in section of the improved lever in locked position, Fig. 2 is a similar view in unlocked position, Fig. 3 is a front view, Fig. 4 is a side view of the upper section of the lever, Fig. 5 is a similar view of the lower section, Fig. 6 is a sectional view at right angles to Figs. 1 and 2 of the upper end of the lower section, with parts separated, Fig. 7 is a plan view of the lower section.

In the present embodiment of the invention the improved lever comprises an upper section 1, and a lower section 2, which are connected together at their adjacent ends by a ball and socket joint 3—4, the section 1 carrying the ball, while the section 2 carries the socket. The socket 4 is sectional, consisting of the portion rigid with the section 2, and a portion 5 which is detachable from the section 2, and is connected thereto by means of bolts and nuts 6, which pass through registering openings in the removable portion and in the fixed portion of the socket.

The lower end of the section and the ball 3 are cored axially as shown at 7, and within this cored opening there is arranged a bolt 8 which is movable longitudinally of the upper section. Referring to Figs. 1 and 2, it will be seen that the upper section of the lever consists of two portions extending at an obtuse angle with respect to each other, and at the junction of the said portions there is provided a laterally opening casing 9, which carries within the same a lock 10 of any usual or desired construction, as for instance a pin or cylinder lock. The releasable portion of this lock is pivotally connected in any usual or desired manner with the bolt 8, as indicated at 11, the arrangement being such that when the lock is operated in one direction by the key the bolt will be withdrawn into the axial opening of the upper section, and with its lower end flush with the lower end of the upper section, as indicated in Fig. 2, while when the lock is turned in the opposite direction the bolt will be extended as shown in Fig. 1.

The lower section 2 has an axial recess 12 for engagement by the lower end of the bolt when the bolt is extended, to lock the sections rigidly together, so that the lever may be operated as a whole from the grip to control the transmission. Preferably the bolt and the openings therefor are polygonal in cross section to prevent rotation of the bolt, although it is obvious that this is not essential and in practice there is provided an opening 13 leading downwardly and outwardly from the bottom of the recess 12, to permit the escape of oil, dirt and the like. The ball and socket joint is mounted in the usual zone shaped bearing 14 in the foot board, and the socket which is substantially spherical serves as the fulcrum upon which the lever moves.

I claim:

A gear shift lever having a fulcrum ball intermediate its ends, and being divided into sections at the ball, one section having a socket and the other a ball received within the socket, said socket forming the fulcrum of the lever, and means controllable by a key for locking the sections in a predetermined position or for releasing the sections, said means comprising a bolt mounted to move axially of the section having the ball, the socket section having an axial recess for engagement by the bolt, and a key controlled lock connected with the bolt for controlling the same.

OLE NELSON.